United States Patent
Chen (10) Patent No.: US 10,503,949 B2
(45) Date of Patent: Dec. 10, 2019

(54) TOUCH SCREEN AND ELECTRONIC DEVICE HAVING THE SAME

(71) Applicant: NANCHANG O-FILM BIO-IDENTIFICATION TECHNOLOGY CO., LTD., Nanchang (CN)

(72) Inventor: Zhen Chen, Nanchang (CN)

(73) Assignee: NANCHANG O-FILM BIO-IDENTIFICATION TECHNOLOGY CO., LTD., Nanchang (CN)

( * ) Notice: Subject to any disclaimer, the term of this patent is extended or adjusted under 35 U.S.C. 154(b) by 164 days.

(21) Appl. No.: 15/785,240

(22) Filed: Oct. 16, 2017

(65) Prior Publication Data

US 2018/0189539 A1 Jul. 5, 2018

(30) Foreign Application Priority Data

Dec. 30, 2016 (CN) .......................... 2016 1 1254679

(51) Int. Cl.
  *G06F 3/045* (2006.01)
  *G06K 9/00* (2006.01)
  *G06F 3/044* (2006.01)

(52) U.S. Cl.
  CPC .......... *G06K 9/0002* (2013.01); *G06F 3/044* (2013.01)

(58) Field of Classification Search
  CPC .......... G06F 3/043; G06F 3/044; G06K 9/00; G06K 9/0002; G06K 9/0004
  See application file for complete search history.

(56) References Cited

U.S. PATENT DOCUMENTS

| | | | | |
|---|---|---|---|---|
| 8,201,739 | B2* | 6/2012 | Schneider | G06K 9/0002 235/439 |
| 9,547,787 | B2* | 1/2017 | Wang | G06K 9/0002 |
| 9,607,203 | B1* | 3/2017 | Yazdandoost | A61B 5/1172 |
| 9,613,246 | B1* | 4/2017 | Gozzini | G06K 9/0002 |
| 9,747,488 | B2* | 8/2017 | Yazdandoost | G06K 9/0002 |
| 9,824,254 | B1* | 11/2017 | Yazdandoost | G06K 9/0002 |
| 9,984,271 | B1* | 5/2018 | King | G06K 9/0002 |
| 10,198,610 | B1* | 2/2019 | Yousefpor | G06K 9/0002 |
| 2003/0174870 | A1* | 9/2003 | Kim | G02F 1/13338 382/124 |
| 2008/0037372 | A1* | 2/2008 | Schneider | G01H 11/06 367/137 |
| 2009/0009488 | A1* | 1/2009 | D'Souza | G06F 3/0436 345/177 |
| 2010/0225600 | A1* | 9/2010 | Dai | G06F 3/016 345/173 |

(Continued)

*Primary Examiner* — Joe H Cheng
(74) *Attorney, Agent, or Firm* — Platinum Intellectual Property LLP (57) ABSTRACT

A touch screen includes a touch panel and an ultrasonic probe. A touch panel includes a cover plate, a first sensing structure including a plurality of receiving electrode lines, a glass sheet, and a second sensing structure including a plurality of transmitting electrode lines. The ultrasonic probe includes a first piezoelectric film and a second piezoelectric film. The first piezoelectric film is attached to the touch panel and electrically coupled to the receiving electrode line, and the second piezoelectric film is attached to the touch panel and electrically coupled to the transmitting electrode line. An electronic device is also provided.

20 Claims, 5 Drawing Sheets

(56) References Cited

U.S. PATENT DOCUMENTS

| | | | | |
|---|---|---|---|---|
| 2011/0074544 A1* | 3/2011 | D'Souza | .............. | G06F 3/0433 340/5.83 |
| 2011/0279662 A1* | 11/2011 | Schneider | ............ | A61B 5/1172 348/61 |
| 2015/0030217 A1* | 1/2015 | Wickboldt | ......... | G06K 9/00026 382/124 |
| 2015/0177884 A1* | 6/2015 | Han | ....................... | G06F 3/044 345/174 |
| 2016/0004899 A1* | 1/2016 | Pi | ........................ | G06F 1/1626 345/173 |
| 2016/0246396 A1* | 8/2016 | Dickinson | ........... | G06F 3/03545 |
| 2017/0199610 A1* | 7/2017 | Kitchens, II | .......... | G06F 1/3215 |
| 2017/0293379 A1* | 10/2017 | Lee | ........................ | G06F 3/044 |
| 2017/0351850 A1* | 12/2017 | Jin | ........................ | G06F 3/0414 |
| 2018/0188848 A1* | 7/2018 | Chen | ....................... | G06F 3/044 |

\* cited by examiner

TOUCH SCREEN AND ELECTRONIC DEVICE HAVING THE SAME

CROSS REFERENCE TO RELATED APPLICATION

This application claims priority to Chinese Patent Application No. 2016112546792, entitled "TOUCH SCREEN WITH FINGERPRINT IDENTIFICATION FEATURE AND ELECTRONIC DEVICE" filed on Dec. 30, 2016, the contents of which are expressly incorporated by reference herein in its entirety.

FIELD OF THE INVENTION

The present disclosure relates to the field of display technology, and more particularly relates to a touch screen and an electric device using the same.

BACKGROUND OF THE INVENTION

A conventional electronic device, such as a mobile phone and a portable android device (PAD), typically includes a fingerprint identification button and a touch screen in response to a user operation. The fingerprint identification button and the touch screen are separately provided on a main body of the electronic device to achieve their own function. However, this configuration reduces the screen-to-body ratio of electronic device, thereby reducing the user experience.

SUMMARY

According to various embodiments, the present disclosure is directed to a touch screen and an electronic device.

The touch screen include a touch panel and an ultrasonic probe. The touch panel includes a first sensing structure including a receiving electrode line, a glass sheet, and a second sensing structure including a transmitting electrode line. The ultrasonic probe includes a first piezoelectric film and a second piezoelectric film. The first piezoelectric film is attached to the touch panel and electrically coupled to the receiving electrode line, the second piezoelectric film is attached to the touch panel and electrically coupled to the transmitting electrode line.

The electronic device includes the touch screen described aforementioned and a main body, the touch screen is mounted on the main body.

The above and other features of the invention including various novel details of construction and combinations of parts, and other advantages, will now be more particularly described with reference to the accompanying drawings and pointed out in the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. The accompanying drawings in the following description are only some embodiments of the present invention, and persons of ordinary skill in the art can derive other obvious variations from the accompanying drawings without creative efforts.

DETAILED DESCRIPTION OF THE EMBODIMENTS

The accompanying drawings according to the embodiments of the present disclosure will be described in the following to illustrate the technical solutions according to the embodiments of the present disclosure more clearly and completely. The described implementations are merely specific embodiments of the present disclosure, and any implementations derived from the foregoing implementations without creative efforts by persons skilled in the art shall all fall within the protection scope of the present disclosure.

As used herein, spatial or directional terms, such as "left", "right", "inner", "outer", "above", "below", "top", "bottom", and the like, are understood to encompass various alternative orientations and, accordingly, such terms are not to be considered as limiting.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
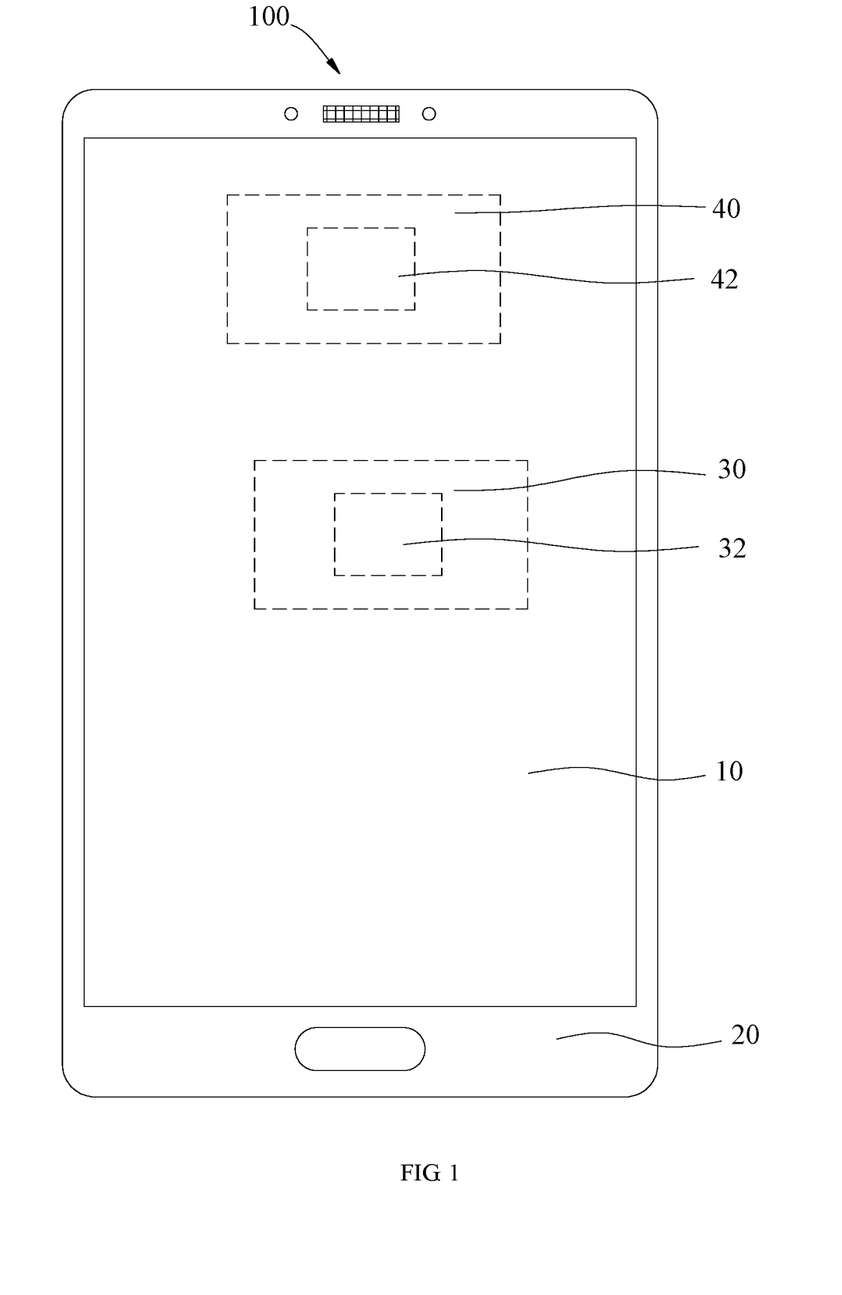
FIG. 1 is a schematic diagram of an electronic device according to an embodiment.

Referring to FIG. 1, an electronic device 100 according to an embodiment includes a touch screen 10 with a function of fingerprint identification, a main body 20, a first circuit 30, a processing chip 32, a second circuit 40, and a processor 42. In the illustrated embodiment, the electric device 100 is a mobile phone. In an alternative embodiment, the electric device 100 can be a tablet personal computer, a notebook computer, a smart bracelet, a smart watch or other smart terminals.

Figure 2:
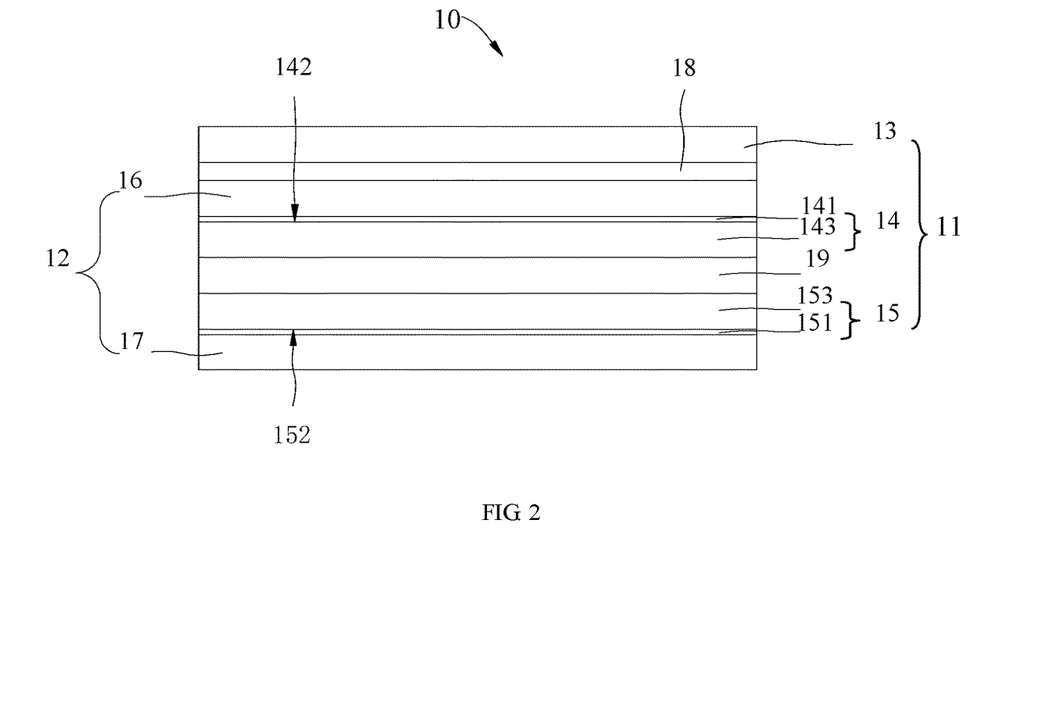
FIG. 2 is a schematic diagram of a touch screen of the electronic device according to an embodiment.

Referring to FIG. 2, the touch screen 10 includes a touch panel 11 and an ultrasonic probe 12. The touch panel 11 is of a double indium tin oxides (DITO) type and includes a cover plate 13, a first sensing structure 14, a glass sheet 19, and a second sensing structure 15. The first sensing structure 14 and the second sensing structure 15 form a capacitive sensing structure. Specifically, the first sensing structure 14 and the second sensing structure 15 are respectively provided with electrodes which form a mutual capacitance with a finger or form a self-capacitance. When the finger of a user touches the cover plate 13, the coordinate value of a contact point can be obtained according to a variation of the capacitance, the preset touch function can be achieved according to the coordinates or variation thereof.

The first sensing structure 14 includes a plurality of receiving electrode lines 141 and a first carrier 143. The first carrier 143 is made of glass and has a first surface 142. The plurality of receiving electrode lines 141 are arranged equally-spaced on the first surface 142.

Figure 3:
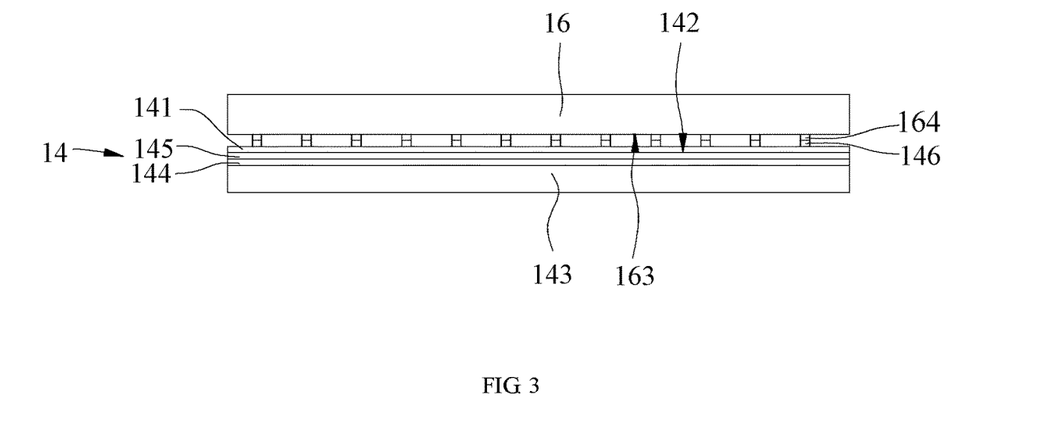
FIG. 3 is a schematic diagram of the first piezoelectric film and a first sensing structure according to an embodiment.

In an alternative embodiment, referring to FIG. 3, the first sensing structure 14 includes a first carrier 143, a first ITO layer 144, a first insulation layer 145, and a plurality of receiving electrode lines 141. The first insulation layer 145, the first ITO layer 144, and the first carrier 143 are sequentially laminated. The first insulation layer 145 is sandwiched between the first ITO layer 144 and the plurality of receiving electrode lines 141 to prevent an electrical connection between the plurality of receiving electrode lines 141 and the first ITO layer 144. At the same time, the first insulation layer 145 is used to carry the plurality of receiving electrode lines 141, so that the plurality of receiving electrode lines 141 are provided on the first insulation layer 145. In addition, a plurality of first pads 146 are formed on the plurality of receiving electrode lines 141 and electronically coupled to the plurality of receiving electrode lines 141.

Referring to FIG. 2, the second sensing structure 15 includes a plurality of transmitting electrode lines 151 and a second carrier 153. The second carrier 153 is made of glass and has a second surface 152. The plurality of transmitting electrode lines 151 are arranged equally-spaced on the second surface 152. Thus, the touch screen 10 can achieve fingerprint identification in a full screen range.

Figure 4:
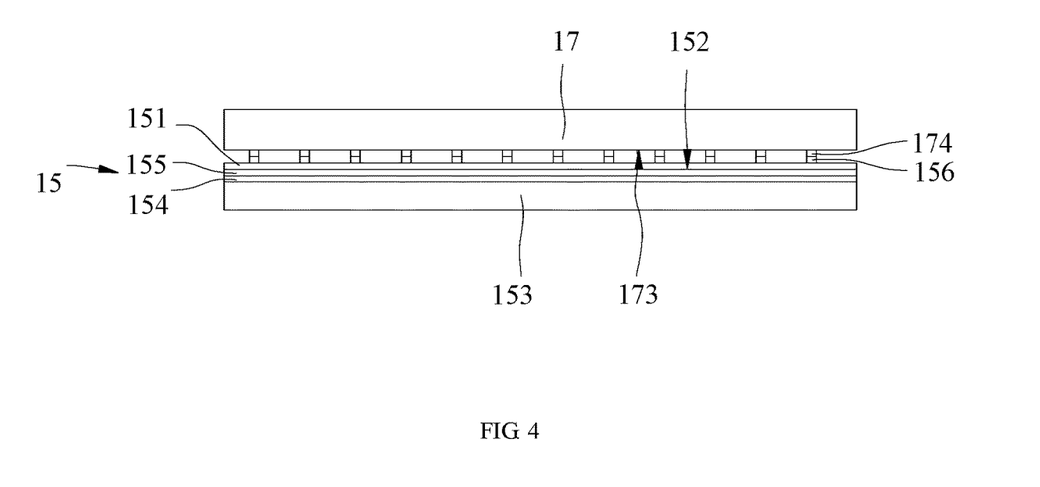
FIG. 4 is a schematic diagram of a second piezoelectric film and a second sensing structure according to an embodiment.

In an alternative embodiment, referring to FIG. 4, the second sensing structure 15 further includes a second carrier 153, a second ITO layer 154, a second insulation layer 155, and a plurality of transmitting electrode lines 151. The second insulation layer 155, the second ITO layer 154, and the second carrier 153 are sequentially laminated. The second insulation layer 155 is sandwiched between the second ITO layer 154 and the plurality of transmitting electrode lines 151 to prevent an electrical connection between the plurality of transmitting electrode lines 151 and the second ITO layer 154. At the same time, the second insulation layer 155 is used to carry the plurality of transmitting electrode lines 151, so that the plurality of transmitting electrode lines 151 are provided on the second insulation layer 155. In addition, a plurality of third pads 156 is formed on the plurality of transmitting electrode lines 151 and are electrically coupled to the plurality of transmitting electrode lines 151.

Orthographic projections of the receiving electrode line 141 and the transmitting electrode line 151 on the cover plate 13 are orthogonal. In an alternative embodiment, orthographic projections of the receiving electrode line 141 and the transmitting electrode line 151 on the cover plate 13 are heterotropic.

Referring to FIG. 2, the ultrasonic probe 12 includes a first piezoelectric film 16 and a second piezoelectric film 17.

The first piezoelectric film 16 is formed on the receiving electrode line 141 and is electrically coupled to the receiving electrode line 141, so that the touch screen 10 has a more stable structure. The first piezoelectric film 16 is used to generate a first piezoelectric signal based on the piezoelectric effect, and is used to generate ultrasonic according to the inverse piezoelectric effect by the piezoelectric pulse signal.

Referring to FIG. 3, the first piezoelectric film 16 has a third surface 163 adjacent to the first sensing structure 14. A plurality of second pads 164 are formed on the third surface 163 and are electrically coupled to the first piezoelectric film 16 and the first pads 146, respectively. In addition, the number of the first pads 146 is the same as the number of the second pads 164.

Figure 5:
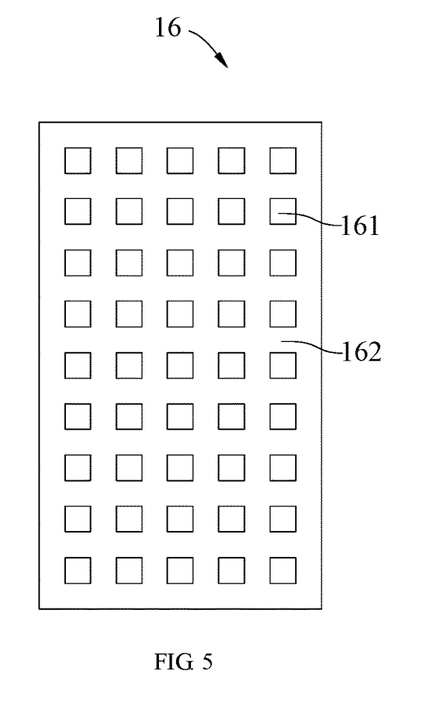
FIG. 5 is a schematic diagram of a first piezoelectric film according to an embodiment.

Referring to FIG. 5, in an alternative embodiment, the first piezoelectric film 16 includes a plurality of piezoelectric column 161 which are equally spaced, a first filler 162 provided between the first piezoelectric column 161. The piezoelectric column 161 generates an electrical signal or a fingerprint electrical signal under the piezoelectric effect and is used to determine the pressing position of the finger or the fingerprint template. The piezoelectric column 161 may be made of PVDF, or piezoelectric ceramic transducer (PZT). The number of the first piezoelectric column 161 is the same as the number of the second pads 164, i.e., each second pad 164 is located on a corresponding first piezoelectric column 161. The first filler 162 is used to isolate the piezoelectric column 161 to prevent electrical connection between the piezoelectric column 161. The first filler 162 may be made of epoxy resin, or polytetrafluoroethylene (PTFE). In some embodiments, the cross-sectional shape of the piezoelectric column 161 may be circular, rectangular, polygonal, or other shapes.

Referring to FIG. 2, the second piezoelectric film 17 is disposed on the transmitting electrode line 151 and is electrically coupled to the transmitting electrode line 151, so that the touch screen 10 has a more stable structure. The second piezoelectric film 17 is used to generate the first piezoelectric signal based on the piezoelectric effect, and is used to generate ultrasonic according to the inverse piezoelectric effect by the piezoelectric pulse signal. The second piezoelectric film 17 is used to receive the ultrasonic reflected by the finger and the fingerprint template, and is used to generate the first fingerprint electrical signal according to the piezoelectric effect. In addition, in some embodiments, the material of the second piezoelectric film 17 is consistent with the material of the first piezoelectric film 16, that is, the second piezoelectric film 17 also includes a plurality of equally-spaced second piezoelectric columns (not shown), a second filler (not shown) located between the second piezoelectric column.

Referring to FIG. 4, the second piezoelectric film 17 has a fourth surface 173 adjacent to the second sensing structure 15. A plurality of fourth pads 174 is formed on the fourth surface 173. The plurality of fourth pads 174 are electrically coupled to the second piezoelectric film 17 and the third pads 156, respectively. In addition, the number of fourth pads 174 is the same as the number of the second piezoelectric 17, i.e., each fourth pad 174 is located on a corresponding second piezoelectric column.

In the illustrated embodiment, the first piezoelectric film 16 and the second piezoelectric film 17 are polyvinylidene fluoride (PVDF) piezoelectric film. Since PVDF piezoelectric film is soft and light in weight, and the matching state is well, PVDF piezoelectric film has high harmonic frequency of the stretching vibration in the thickness direction. Thus a wide flat frequency response can be obtained, and the width of the frequency response is much better than ordinary piezoelectric ceramic Energy transducer. Therefore, the first piezoelectric film 16 and the second piezoelectric film 17 can convert the fingerprint pressed against the cover plate 13 into a fingerprint signal, thereby enabling the touch screen 10 to better recognize the fingerprint information of the fingerprint.

In the illustrated embodiment, the sizes of the first sensing structure 14, the second sensing structure 15, the first piezoelectric film 16, and the second piezoelectric film 17 are the same.

Referring to FIG. 2, the touch screen 10 further includes a liquid optically clear adhesive (OCA) 18. The liquid OCA 18 is used to bond the cover plate 13 and the first piezoelectric film 16. The two adjacent elements of the touch screen 10 are bonded by OCA or viscose, so that the touch screen 10 has a more stable structure.

In the illustrated embodiment, the first piezoelectric film 16 is positioned on a side of the first sensing structure 14 adjacent to the cover plate 13. The first sensing structure 14 is positioned on a side of the first piezoelectric film 16 away from the cover plate 13. The liquid OCA 18 is sandwiched between the cover plate 13 and the first piezoelectric film 16. The glass sheet 19 is positioned on a side of the first sensing structure 14 away from the cover plate 13. The second sensing structure 15 is positioned on a side of the glass sheet 19 away from the cover plate 13. The second piezoelectric film 17 is positioned on a side of the second sensing structure 15 away from the cover plate 13.

Figure 6:
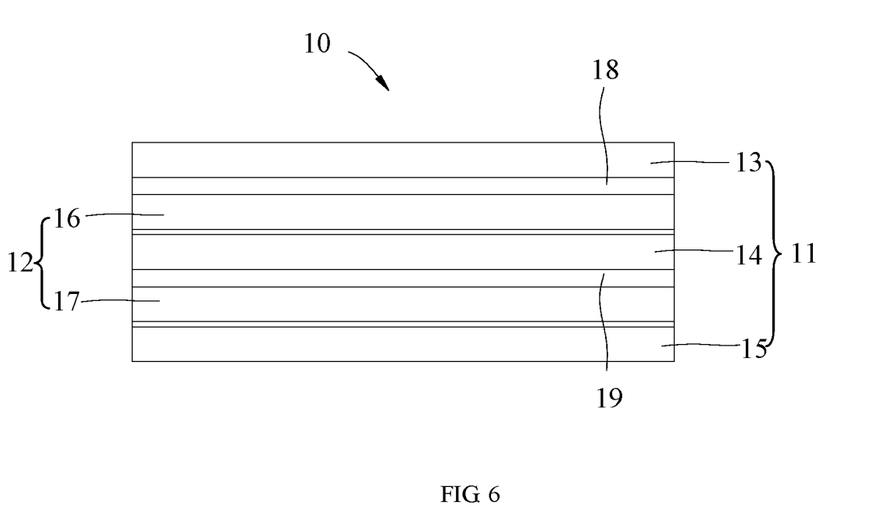
FIG. 6 is a schematic diagram of a touch screen of the electronic device according to another embodiment.

In an alternative embodiment, referring to FIG. 6, the first piezoelectric film 16 is positioned on a side of the first sensing structure 14 adjacent to the cover plate 13. The first sensing structure 14 is positioned on a side of the first piezoelectric film 16 away from the cover plate 13. The liquid OCA 18 is sandwiched between the cover plate 13 and the first piezoelectric film 16. The glass sheet 19 is positioned on a side of the first sensing structure 14 away from the cover plate 13. The second piezoelectric film 17 is positioned on a side of glass sheet 19 away from the cover plate 13. The second sensing structure 15 is positioned on a side of the second piezoelectric film 17 away from the cover plate 13.

Figure 7:
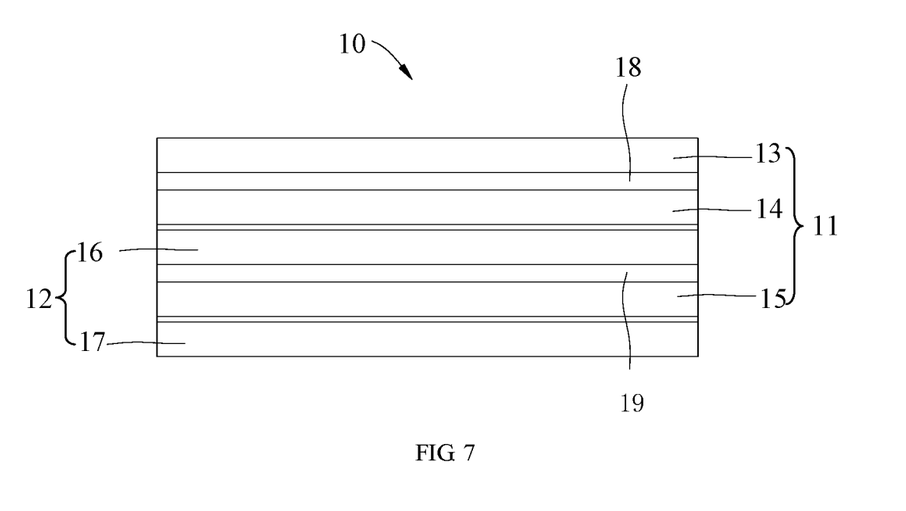
FIG. 7 is a schematic diagram of a touch screen of the electronic device according to yet another embodiment.

In an alternative embodiment, referring to FIG. 7, the first sensing structure 14 is positioned on a side of the first piezoelectric film 16 adjacent to the cover plate 13. The first piezoelectric film 16 is positioned on a side of the first sensing structure 14 away from the cover plate 13. The liquid OCA 18 is sandwiched between the cover plate 13 and the first sensing structure 14. The glass sheet 19 is positioned on a side of the first piezoelectric film 16 away from the cover plate 13. The second sensing structure 15 is positioned on a side of the glass sheet 19 away from the cover plate 13. The second piezoelectric film 17 is positioned on a side of the second sensing structure 15 away from the cover plate 13.

Figure 8:
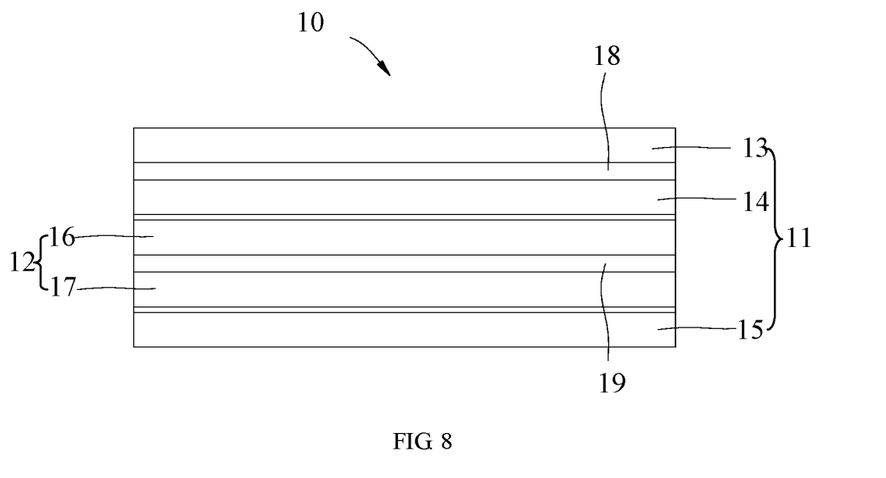
FIG. 8 is a schematic diagram of a touch screen of the electronic device according to yet another embodiment.

In an alternative embodiment, referring to FIG. 8, the first sensing structure 14 is positioned on a side of the first piezoelectric film 16 adjacent to the cover plate 13. The first piezoelectric film 16 is positioned on a side of the first sensing structure 14 away from the cover plate 13. The liquid OCA 18 is sandwiched between the cover plate 13 and the first sensing structure 14. The glass sheet 19 is positioned on a side of the first piezoelectric film 16 away from the cover plate 13. The second piezoelectric film 17 is positioned on a side of the glass sheet 19 away from the cover plate 13. The second sensing structure 15 is positioned on a side of the second piezoelectric film 17 away from the cover plate 13.

Referring to FIG. 1, the processing chip 32 is mounted on the first circuit 30. The first circuit 30 is electrically connected the first piezoelectric film 16 and the second piezoelectric film 17. The first circuit 30 is used to transmit the ultrasonic generated by the first piezoelectric film 16 to the second piezoelectric film 17. The first circuit 30 is used to transmit the two first piezoelectric signals generated by the first piezoelectric film 16 and the second piezoelectric film 17 to the processing chip 32. The first circuit 30 is used to transmit the two first fingerprint signals generated by the first piezoelectric film 16 and the second piezoelectric film 17 to the processing chip 32. The processing chip 32 is used to process and integrate the two first piezoelectric signals to form a second piezoelectric signal with an intensity boost. The processing chip 32 is used to process and integrate the two first fingerprint signals to form a second fingerprint signal with an intensity boost.

The processor 42 is mounted on the second circuit 40, and the second circuit 40 is electrically coupled to the receiving electrode line 141 and the transmitting electrode line 151. In some embodiments, the second circuit 40 is electrically coupled to the first circuit 30, directly, or by the receiving electrode line 141 and the transmitting electrode line 151. The second circuit 40 is used to convert the second piezoelectric signal into a piezoelectric pulse signal to transmit the piezoelectric pulse signal to the receiving electrode line 141 and the transmitting electrode line 151 and to transmit the second fingerprint electrical signal to the processor 42. The processor 42 is used to process and convert the second fingerprint electrical signal and into a data signal. At the same time, the processor 42 is used to store the data signal in the electronic device 100 as a fingerprint template or to compare the data signal with the fingerprint template stored in the electronic device 100.

When the user presses the cover plate 13 with a finger, the first piezoelectric film 16 and the second piezoelectric film 17 generate the two first piezoelectric signals under the piezoelectric effect. The two first piezoelectric signals are transmitted to the processing chip 32 by the first circuit 30 to integrate the second piezoelectric signal. The second piezoelectric signal is transmitted to the second circuit 40 by the receiving electrode line 141 and the emitter line 151. The second circuit 40 processes and convert the second piezoelectric signal into the piezoelectric pulse signal. The piezoelectric pulse signal is transmitted by the second circuit 40 to the first piezoelectric film 16 and the second piezoelectric film 17. The first piezoelectric film 16 and the second piezoelectric film 17 will vibrate and generate the ultrasonic according to the inverse piezoelectric effect by the piezoelectric pulse signal. The ultrasonic generated by the first piezoelectric film 16 is transmitted by the first circuit 30 to the second piezoelectric film 17. The transmitting electrode line 151 can reflect an ultrasonic fingerprint signal after emitting the ultrasonic to the finger or finger template provided on the cover plate 13. The ultrasonic fingerprint signal is received by the first piezoelectric film 16 and the second piezoelectric film 17. The two first fingerprint signals are transmitted to the processing chip 32 by the first circuit to be processed and integrated to form the second fingerprint signal. The second fingerprint signal is transmitted to the processor 42 by the receiving electrode line 141 and the transmitting electrode line 151 via the second circuit 40. The processor 42 converts the second fingerprint signal into the data signal. The processor 42 stores the data signal in the electronic device 100 as a fingerprint template or compares the data signal to the fingerprint template stored in the electronic device 100 to determine whether the data signal is in accordance with the fingerprint template to perform a preset operation to the electronic device.

The electronic device 100 integrates the ultrasonic probe 12 on the touch panel 11, so that the touch screen 10 of the electronic device 100 can realize the touch function of the touch panel 11 and realize the fingerprint identification function of the ultrasonic probe 12. At the same time, the space of the main body 20 occupied by the ultrasonic probe 12 can be reduced, thereby improving the experience of the user.

By merits of the first circuit 340 and the processing chip, the condition that the signals generated by the first piezoelectric film 16 and the second piezoelectric film 17 are canceled and have a poor superposition effect will be prevented, at the same time, the signals can have a better superposition effect, thereby enhance the intensity of the signals.

The technical features of the embodiments described above can be arbitrarily combined. In order to make the description succinct, there is no describing of all possible combinations of the various technical features in the aforementioned embodiments. It should be noted that there is no contradiction in the combination of these technical features which should be considered as the scope of the description.

The foregoing implementations are merely specific embodiments of the present disclosure, but are not intended to limit the protection scope of the present disclosure. It should be noted that persons skilled in the art can understand and embody all or part of flowcharts of the above implementations. Equivalent variation figured out by persons skilled in the art shall all fall within the protection scope of the present disclosure.

What is claimed is:

1. A touch screen for fingerprint identification, comprising:
    a touch panel comprising:
    a cover plate;
    a first sensing structure disposed on the cover plate and comprising a receiving electrode line;
    a glass sheet disposed on the first sensing structure; and
    a second sensing structure disposed on the glass sheet and comprising a transmitting electrode line; and
    an ultrasonic probe comprising:
        a first piezoelectric film attached to the touch panel and electrically coupled to the receiving electrode line; and
        a second piezoelectric film attached to the touch panel and electrically coupled to the transmitting electrode line,
    wherein, upon the touch of a user's finger, each of the first piezoelectric film and the second piezoelectric film is configured to generate a first piezoelectric signals that are integrated into a second piezoelectric signal;
    wherein the second piezoelectric signal is converted into a piezoelectric pulse signal that are transmitted to the first piezoelectric film;
    wherein the first piezoelectric film is configured to vibrate and generate ultrasonic to the second piezoelectric film according to the piezoelectric pulse signal; and
    wherein each of the first piezoelectric film and the second piezoelectric film is configured to send a first fingerprint electrical signal that are integrated into a second fingerprint electrical signal.

2. The touch screen of claim 1, wherein the first sensing structure comprises a first carrier made of glass, the receiving electrode line is arranged on the first carrier, the second sensing structure comprising a second carrier made of glass, the transmitting electrode line is arranged on the second carrier; the touch screen is a double indium tin oxides (DITO) type touch screen.

3. The touch screen of claim 1, further comprising a liquid optically clear adhesive (OCA) sandwiched between the cover plate and the first piezoelectric film.

4. The touch screen of claim 1, wherein the first piezoelectric film is positioned on a side of the first sensing structure adjacent to the cover plate, and the second piezoelectric film is positioned on a side of the second sensing structure adjacent to the cover plate.

5. The touch screen of claim 1, wherein the first piezoelectric film is positioned on a side of the first sensing structure adjacent to the cover plate; the second piezoelectric film is positioned on a side of the second sensing structure away from the cover plate.

6. The touch screen of claim 1, wherein the first piezoelectric film is positioned on a side of the first sensing structure away from the cover plate; the second piezoelectric film is positioned on a side of the second sensing structure adjacent to the cover plate.

7. The touch screen of claim 1, wherein the first piezoelectric film is positioned on a side of the first sensing structure away from the cover plate; the second piezoelectric film is positioned on a side of the second sensing structure away from the cover plate.

8. The touch screen of claim 1, wherein the first piezoelectric film and the second piezoelectric film are made of polyvinylidene fluoride.

9. The touch screen of claim 1, wherein orthographic projections of the receiving electrode line and the transmitting electrode line on the cover plate are orthogonal.

10. The touch screen of claim 1, wherein orthographic projections of the receiving electrode line and the transmitting electrode line on the cover plate are heterotropic.

11. An electronic device, comprising:
    a main body; and
    a touch screen mounted on the main body, the touch screen comprising;
    a cover plate;
    a first sensing structure disposed on the cover plate and comprising a receiving electrode line;
    a glass sheet disposed on the first sensing structure; and
    a second sensing structure disposed on the glass sheet and comprising a transmitting electrode line; and
    an ultrasonic probe comprising:
        a first piezoelectric film attached to the touch panel and electrically coupled to the receiving electrode line; and
        a second piezoelectric film attached to the touch panel and electrically coupled to the transmitting electrode line,
    wherein, upon the touch of a user's finger, each of the first piezoelectric film and the second piezoelectric film is configured to generate a first piezoelectric signals that are integrated into a second piezoelectric signal;
    wherein the second piezoelectric signal is converted into a piezoelectric pulse signal that are transmitted to the first piezoelectric film;
    wherein the first piezoelectric film is configured to vibrate and generate ultrasonic to the second piezoelectric film according to the piezoelectric pulse signal; and
    wherein each of the first piezoelectric film and the second piezoelectric film is configured to send a first fingerprint electrical signal that are integrated into a second fingerprint electrical signal.

12. The electronic device of claim 11, further comprising:
    a first circuit mounted in the main body; and
    a processing chip mounted on the first circuit;
    wherein the first circuit is electrically coupled to the first piezoelectric film and the second piezoelectric film.

13. The electronic device of claim 12, further comprising:
a second circuit mounted in the main body;
a processor mounted on the second circuit;
wherein the second circuit is electrically coupled to the receiving electrode line and the transmitting electrode line; the second circuit is configured to convert the second piezoelectric signal into a piezoelectric pulse signal and send the piezoelectric pulse signal to the receiving electrode line and the transmitting electrode line; the second circuit is configured to send the second fingerprint electric signal to the processor; and the processor is configured to process and convert the second fingerprint electric signal into a data signal.

14. The electronic device of claim 11, wherein the first sensing structure comprises a first carrier made of glass, the receiving electrode line is arranged on the first carrier, the second sensing structure comprising a second carrier made of glass, the transmitting electrode line is arranged on the second carrier; the touch screen is a DITO type touch screen.

15. The electronic device of claim 11, wherein the touch screen further comprises a first liquid OCA sandwiched between the cover plate and the first piezoelectric film.

16. The electronic device of claim 11, wherein the first piezoelectric film is positioned on a side of the first sensing structure adjacent to the cover plate, and the second piezoelectric film is positioned on a side of the second sensing structure adjacent to the cover plate.

17. The electronic device of claim 11, wherein the first piezoelectric film is positioned on a side of the first sensing structure adjacent to the cover plate; the second piezoelectric film is positioned on a side of the second sensing structure away from the cover plate.

18. The electronic device of claim 11, wherein the first piezoelectric film is positioned on a side of the first sensing structure away from the cover plate; the second piezoelectric film is positioned on a side of the second sensing structure adjacent to the cover plate.

19. The electronic device of claim 11, wherein the first piezoelectric film is positioned on a side of the first sensing structure away from the cover plate; the second piezoelectric film is positioned on a side of the second sensing structure away from the cover plate.

20. The electronic device of claim 11, wherein the first piezoelectric film and the second piezoelectric film are made of polyvinylidene fluoride.

* * * * *